United States Patent
Kim et al.

(10) Patent No.: US 8,515,248 B2
(45) Date of Patent: Aug. 20, 2013

(54) RECORDING MEDIUM HAVING A DATA STRUCTURE FOR MANAGING REPRODUCTION OF TEXT SUBTITLE DATA RECORDED THEREON AND RECORDING AND REPRODUCING METHODS AND APPARATUSES

(75) Inventors: Hyung Sun Kim, Seoul (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 409 days.

(21) Appl. No.: 12/801,276

(22) Filed: Jun. 1, 2010

(65) Prior Publication Data

US 2010/0247078 A1    Sep. 30, 2010

Related U.S. Application Data

(63) Continuation of application No. 10/898,206, filed on Jul. 26, 2004, now Pat. No. 7,729,595.

(30) Foreign Application Priority Data

Jul. 25, 2003 (KR) .......................... 10-2003-051252

(51) Int. Cl.
- *H04N 5/92* (2006.01)
- *H04N 9/80* (2006.01)
- *H04N 5/84* (2006.01)
- *H04N 5/89* (2006.01)

(52) U.S. Cl.
USPC ........... 386/244; 386/239; 386/246; 386/248; 386/326; 386/330; 386/332; 386/334; 386/337

(58) Field of Classification Search
USPC ................. 386/244, 239, 246, 248, 326, 330, 386/332, 334, 337
See application file for complete search history.

(56) References Cited

U.S. PATENT DOCUMENTS

| | | | |
|---|---|---|---|
| 4,040,088 | A | 8/1977 | Hannan |
| 5,519,443 | A | 5/1996 | Salomon et al. |
| 5,949,752 | A | 9/1999 | Glynn et al. |
| 5,999,225 | A | 12/1999 | Yagasaki et al. |
| 5,999,255 | A | 12/1999 | Dupee et al. |

(Continued)

FOREIGN PATENT DOCUMENTS

| | | |
|---|---|---|
| CN | 1153981 A | 7/1997 |
| CN | 1264894 A | 8/2000 |

(Continued)

OTHER PUBLICATIONS

Digital Video Broadcasting(DVB) Subtitling System, Oct. 2002, STSI EN 300 743 V1.2.1.*

(Continued)

*Primary Examiner* — Daquan Zhao
(74) *Attorney, Agent, or Firm* — Harness, Dickey & Pierce, P.L.C.

(57) ABSTRACT

In the data structure for managing reproduction of text subtitle data, a text subtitle information area stores at least one text subtitle information segment. The text subtitle information segment is represented by a single PES packet of transport packets. In one embodiment, the text subtitle information segment includes an identifier identifying the text subtitle information segment as a text subtitle information segment and includes style information for text subtitle data.

20 Claims, 9 Drawing Sheets

Object Data Segment Syntax

```
Object_data_segment ( ) {
    segment_type
    segment_length
    object_type
    if (object_type = = text)
        text_object_data ( )
    else {
        object_data ( )
    }
}
```

```
text_object_data( ) {
    object_id
    text_object_number
    for (j=0; j<text_object_number; j++) {
        text_property fields
        font_property fields
        text_length
        for (i=0; i<text_length; i++) {
            character_code
        }
    }
}
```

(56) References Cited

U.S. PATENT DOCUMENTS

| | | | |
|---|---|---|---|
| 6,115,077 | A | 9/2000 | Tsukagoshi |
| 6,204,883 | B1 | 3/2001 | Tsukagoshi |
| 6,219,043 | B1 | 4/2001 | Yogeshwar et al. |
| 6,253,221 | B1 | 6/2001 | Kim |
| 6,275,457 | B1 | 8/2001 | Maeda |
| 6,288,990 | B1 | 9/2001 | Fujiie et al. |
| 6,381,513 | B1 | 4/2002 | Takase et al. |
| 6,452,609 | B1 | 9/2002 | Katinsky et al. |
| 6,477,185 | B1 | 11/2002 | Komi et al. |
| 6,763,178 | B1 | 7/2004 | Suzuki et al. |
| 7,197,234 | B1 | 3/2007 | Chatterton |
| 7,324,119 | B1 * | 1/2008 | Puri et al. ............ 345/602 |
| 7,558,467 | B2 | 7/2009 | Seo et al. |
| 7,729,594 | B2 | 6/2010 | Seo et al. |
| 7,848,617 | B2 | 12/2010 | Seo et al. |
| 2001/0030710 | A1 | 10/2001 | Werner |
| 2002/0006271 | A1 | 1/2002 | Winter et al. |
| 2002/0061188 | A1 | 5/2002 | Heo |
| 2002/0106193 | A1 | 8/2002 | Park et al. |
| 2002/0135607 | A1 | 9/2002 | Kato et al. |
| 2002/0194618 | A1 | 12/2002 | Okada et al. |
| 2003/0021586 | A1 | 1/2003 | Suh |
| 2003/0123845 | A1 | 7/2003 | Koda et al. |
| 2003/0156504 | A1 | 8/2003 | Kanegae et al. |
| 2003/0190147 | A1 | 10/2003 | Lee |
| 2003/0202431 | A1 | 10/2003 | Kim et al. |
| 2003/0235406 | A1 | 12/2003 | Seo et al. |
| 2004/0001699 | A1 | 1/2004 | Seo et al. |
| 2004/0081434 | A1 * | 4/2004 | Jung et al. ............ 386/95 |
| 2004/0101285 | A1 | 5/2004 | Seo et al. |
| 2005/0008339 | A1 | 1/2005 | Kuroiwa et al. |
| 2005/0019007 | A1 | 1/2005 | Kato et al. |
| 2005/0084248 | A1 | 4/2005 | Yoo et al. |
| 2005/0105888 | A1 | 5/2005 | Hamada et al. |
| 2005/0196140 | A1 | 9/2005 | Moteki |
| 2005/0201718 | A1 | 9/2005 | Kato |
| 2006/0098936 | A1 | 5/2006 | Ikeda et al. |
| 2006/0146660 | A1 | 7/2006 | Ikeda et al. |
| 2006/0153532 | A1 * | 7/2006 | McCrossan et al. ....... 386/95 |
| 2006/0156358 | A1 | 7/2006 | Adolph et al. |
| 2006/0288302 | A1 | 12/2006 | Yahata et al. |
| 2007/0127885 | A1 | 6/2007 | Seo et al. |
| 2008/0253734 | A1 | 10/2008 | Kang et al. |
| 2009/0185075 | A1 | 7/2009 | Jung et al. |

FOREIGN PATENT DOCUMENTS

| | | |
|---|---|---|
| CN | 1385857 | 12/2002 |
| CN | 1399467 | 2/2003 |
| CN | 1415109 | 4/2003 |
| CN | 1428770 | 7/2003 |
| EP | 0 737 009 | 10/1996 |
| EP | 0 737 979 | 10/1996 |
| EP | 0 791 925 | 8/1997 |
| EP | 0 942 609 | 9/1999 |
| EP | 1 173 031 | 1/2002 |
| EP | 1198132 | 4/2002 |
| EP | 1 204 280 | 5/2002 |
| EP | 1 280 347 | 1/2003 |
| EP | 1 408 505 | 4/2004 |
| EP | 1 614 108 | 10/2004 |
| EP | 1553769 | 7/2005 |
| EP | 1 643 765 | 4/2006 |
| GB | 1 556 366 | 11/1979 |
| GB | 1 586 431 | 3/1981 |
| JP | 60-179261 | 9/1985 |
| JP | 08-273304 | 10/1996 |
| JP | 09-035458 | 2/1997 |
| JP | 11-176137 | 7/1999 |
| JP | 2001-135066 | 5/2001 |
| JP | 2002-025197 | 1/2002 |
| JP | 2002-101389 | 4/2002 |
| JP | 2002-158971 | 5/2002 |
| JP | 2002-247526 | 8/2002 |
| JP | 2003-134440 | 5/2003 |
| JP | 2003-249057 | 9/2003 |
| JP | 2003-283942 | 10/2003 |
| RU | 2196389 | 1/2003 |
| RU | 2229174 | 5/2004 |
| WO | WO 99/22516 | 5/1999 |
| WO | WO 02-075739 | 9/2002 |
| WO | WO 03/056560 | 7/2003 |
| WO | WO 2004-030356 | 4/2004 |
| WO | WO 2004/034398 | 4/2004 |
| WO | WO 2004/036574 | 4/2004 |
| WO | WO 2004/056105 | 7/2004 |
| WO | WO 2004/066281 | 8/2004 |
| WO | WO 2004/090885 | 10/2004 |
| WO | WO 2004/093064 | 10/2004 |
| WO | WO 2004/098186 | 11/2004 |
| WO | WO 2005/031740 | 4/2005 |
| WO | WO 2005/074394 | 8/2005 |
| WO | WO 2005/074399 | 8/2005 |

OTHER PUBLICATIONS

ETSI EN 300 743 V1.2.1 (Oct. 2002) "Digital Video Broadcasting (DVB); Subtitling systems".

Notice of Allowance dated May 23, 2011 for co-pending U.S. Appl. No. 10/960,486.

Office Action dated Mar. 12, 2010 by the Japanese Patent Office for counterpart Japanese Application No. 2006-535258, with English Translation.

"WC3 Synchronized Multimedia Integration Language (SMIL) 1.0 Specification," Internet Citation, Jun. 15, 1998, XP002957990, retrieved on Oct. 28, 2002, pp. 11, 16-18, 20 and 22-25.

Blu-Ray Disc Founders, "White Paper Blu-Ray Disc Format: 2.B Audio Visual Application Format Specifications for BD-ROM," Internet Citation, Aug. 2004, XP002315435, Retrieved from the Internet: URL:http://www.blu-raydisc.com/assets/downloadablefile/2b_bdrom_audiovisualapplication-12841.pdf, Retrieved on Jan. 23, 2005.

Search Report for corresponding European Application No. 04774776.1 dated Dec. 28, 2009.

Office Action for corresponding U.S. Appl. No. 10/960,485 dated Feb. 22, 2010.

Office Action by Japanese Patent Office dated Sep. 15, 2009 for counterpart Japanese Application No. 2006-535261.

Notice of Allowance by European Patent Office dated Jun. 3, 2009 for counterpart European Application No. 05 721 896.8.

Article: Information Technology—Generic coding of moving pictures and associated audio information: Systems—published ISO-IEC/13818-1, Dec. 1, 2000.

Notice of Allowance by Russian Patent Office dated May 28, 2009 for counterpart Russian Application No. 2006-116489.

Notice of Allowance by Russian Patent Office dated May 18, 2009 for counterpart Russian Application No. 2006-116506.

Office Action by Japanese Patent Office dated May 8, 2009 for counterpart Japanese Application No. 2006-535261.

Office Action by Russian Patent Office dated Feb. 18, 2009 for counterpart Russian application.

Blu-ray Disc—white paper blu-ray disc formal—Mar. 2005.

European Search Report for counterpart European application, dated Jan. 31, 2005.

Office Action dated Oct. 30, 2008 by the Russian Patent Office for a counterpart Russian application.

"Digital Video Broadcasting (DVB)" ETSI Standards, European Telecommunications Standards Institute, Sophia-Antipo, FR, vol. BC, No. V121, Jun. 2002, XP014001876.

"WC3 Synchronized Multimedia Integration Language (SMIL) 1.0 specification," Jun. 15, 1998.

International Search Report dated Nov. 6, 2004.

European Search Report dated Jul. 24, 2007.

Office Action dated Jan. 29, 2010 by the Chinese Patent Office for counterpart Chinese application No. 20040030092.2.

ETSI EN 300 743, Digital Video Broadcasting (DVB);Subtitling System V1.2.1 (Oct. 2002).

Chinese Office Action dated Oct. 10, 2011 in corresponding Chinese Applications No. 200580008629.X, with English translation.

Japanese Office Action/Decision to Grant a Patent, dated Nov. 25, 2010, issued for Application No. 2006-535258 and English Translation thereof.

Notice of Allowance dated Jul. 14, 2011 for U.S. Appl. No. 10/960,485.

Office Action dated Feb. 1, 2011, in co-pending U.S. Appl. No. 10/960,485.

"ETSI EN 300 743, V1.2.1 (Oct. 2002), European Standard (Telecommunications series), Digital Video Broadcasting (DVB); Subtitling Systems." European Telecommunications Standards Institute, European Broadcasting Union, 2002.

"ETSI EN 300 742, V1.3.1 (May 2003), European Standard (Telecommunications series), Digital Video Broadcasting (DVB); Specification for conveying ITU-R System B Teletext in DVB bistreams." European Telecommunications Standards Institute, European Broadcasting Union, 2003.

Blu-ray Disc—white paper blu-ray disc format—Mar. 2005.

ETSI EN 300 743, Digital Video Broadcasting (DVB);Subtitling System V1.2.1 (2002-10).

"Digital Video Broadcasting (DVB); subtitling system", European Telecommunications Standards Institute, V1.2.1, Oct. 2002.

Office Action dated Jan. 20, 2011, in co-pending U.S. Appl. No. 10/960,486.

Office Action for corresponding U.S. Appl. No. 12/591,296 dated Oct. 5, 2012.

* cited by examiner

FIG. 3

Page Composition Segment Syntax

```
page_composition_segment () {
        segment_type
        segment_length
        page_time_out
        page_version_number
        page_state
        CLUT_id
        number_of_object_entries
        if (i=0; i<number_of_object_entries; i++) {
                object_id
                is_object_cropping
                object_horizontal_address
                object_vertical_address
                if (is_object_cropping) {
                        object_horizontal_cropping
                        object_vertical_cropping
                        object_cropping_width
                        object_cropping_height
                }
        }
}
```

FIG. 4

CLUT Definition Segment Syntax

```
CLUT_definition_segment () {
        segment_type
        segment_length
        CLUT_id
        for (color_index=0; color_index <256; color_index++)
                CLUT_entry_id
                Y-value
                Cr-value
                Cb-value
                T-value
                }
        }
}
```

Object Data Segment Syntax

```
Object_data_segment ( ) {
    segment_type
    segment_length
    object_type
    if (object_type = = text)
        text_object_data ( )
    else {
        object_data ( )
    }
}
```

FIG. 5

```
text_object_data( ) {
    object_id
    text_object_number
    for (j=0; j<text_object_number; j++) {
        text_property fields
        font_property fields
        text_length
        for (i=0; i<text_length; i++) {
            character_code
        }
    }
}
```

FIG. 6

| Text Property | |
|---|---|
| Property | Contents |
| Text-align | left, right, center, justify |
| Text-decoration | overline, underline, line-through, blink, none |
| Text-indent | size |
| Text-transform | capitalize, uppercase, lowercase, none |
| Letter-spacing | - |
| White-space | nowrap, normal |
| Word-spacing | size |
| Text-justify | auto, distribute-all, inter-cluster, inter-indeograph, inter-word, newspaper |

FIG. 7

| Font Property | |
|---|---|
| Property | Contents |
| Font | font-style, font-variant, font-weight, font-size, line-height, font-family |
| Font-family | serif, sans-serif, cursive, fantasy, monospace |
| Font-size | xx-small, x-small, medium, large, x-large, xx-large, small, medium |
| Font-style | italic, oblique, normal |
| Font-variant | small-caps, normal |
| Font-weight | normal, bold, lighter |

Object Data Segment Syntax

FIG. 8

```
Object_data_segment ( ) {
    segment_type
    segment_length
    object_type
    if (object_type = = text)
            text_object_data ( )
    else {
            object_data ( )
    }
}
```

```
object_data ( ) {
    object_id
    object_width
    object_height
    do{ run_length_code
    } while (run_length_code ! = '0 x0000)
}
```

FIG. 9

End of Display set Segment Syntax

```
end_of_display_set_segment () {
    segment_type
    reserved
    segment_length
}
```

FIG. 13

Page Composition Segment Syntax

```
page_composition_segment () {
    segment_type
    segment_length
    page_time_out
    page_version_number
    page_state
    CLUT_id
    number_of_object_entries
    if (i=0; i<number_of_object_entries; i++) {
        object_id
        object_type
        text_property_fields
        font_property_fields
        is_object_cropping
        object_horizontal_address
        object_vertical_address
        if (is_object_cropping) {
            object_horizontal_cropping
            object_vertical_cropping
            object_cropping_width
            object_cropping_height
        }
    }
}
```

FIG. 14

Text-Object Data Segment Syntax

```
Object_data_segment ( ) {
    segment_type
    segment_length
    text_object_data( ) {
        object_id
        text_object_number
        for (j=0; j<text_object_number; j++) {
            text_property fields
            font_property fields
            text_length
            for (i=0; i<text_length; i++) {
                character_code
            }
        }
    }
}
```

FIG. 15

BMP-Object Data Segment Syntax

```
Object_data_segment ( ) {
    segment_type
    segment_length
    bmp_object_data( ) {
        object_id
        object_width
        object_height
        do{ run_length_code
        } while (run_length_code ! = '0 x0000)
    }
}
```

RECORDING MEDIUM HAVING A DATA STRUCTURE FOR MANAGING REPRODUCTION OF TEXT SUBTITLE DATA RECORDED THEREON AND RECORDING AND REPRODUCING METHODS AND APPARATUSES

PRIORITY INFORMATION

The subject application claims priority under 35 U.S.C. §119 to Korean Application No. 10-2003-051252 filed Jul. 25, 2003; the entire contents of which are hereby incorporated by reference.

This is a continuation of, and claims priority under 35 U.S.C. §120, to U.S. patent application Ser. No. 10/898,206 filed Jul. 26, 2004 now U.S. Pat. No. 7,729,595, the entire contents of which are hereby incorporated by reference.

BACKGROUND OF THE INVENTION

1. Field of the Invention

The present invention relates to a high-density recording medium such as a Blu-ray Disc-ROM (BD-ROM) and associated methods and apparatuses of recording and reproducing.

2. Description of the Related Art

Optical disks capable of storing large amounts of high-quality digital video/audio data such as DVDs (digital versatile disks) and DVD recording/reproducing apparatuses are now commercially available on the market.

Subtitle data such as caption or logo data to be superimposed on main video data of a DVD is recorded thereon as graphic data. An optical disk reproducing apparatus reproduces the subtitle graphic data and main video data of the DVD and displays the main video data and subtitle data together on the screen of an external display apparatus connected to the optical disk reproducing apparatus.

A user of such an optical disk reproducing apparatus, therefore, can view the main video data of a DVD overlaid with related subtitle data (e.g., caption or logo images) using a display apparatus connected to the optical disk reproducing apparatus.

In the mean time, the standardization of new high-density optical disks having higher storage capacity than a DVD has been progressing rapidly. The Blu-ray Disk ROM (BD-ROM) is an example of such new optical disks. An effective method for managing and reproducing subtitle data and graphic image data of the BD-ROM is not yet available.

SUMMARY OF THE INVENTION

A recording medium according to the present invention includes a data structure for managing reproduction of text subtitle data.

In one embodiment, the recording medium stores at least one text subtitle information segment. The text subtitle information segment is represented by a single PES packet of transport packets. The text subtitle information segment includes an identifier identifying the text subtitle information segment as a text subtitle information segment and includes style information for text subtitle data. For example, the style information may indicate at least one of font size, font style and font set for text subtitle data.

In one example embodiment, the text subtitle information segment also includes the text subtitle data. For example, the text subtitle data may be character code data.

In another exemplary embodiment, the recording medium stores at least one text subtitle information segment. Here, the text subtitle information segment includes an identifier identifying the text subtitle information segment as a text subtitle information segment, includes character code data as text subtitle data and includes style information for the text subtitle data.

In a further exemplary embodiment, the recording medium stores at least one text subtitle information segment represented by a single PES packet of transport packets. The text subtitle information segment includes an identifier identifying the text subtitle information segment as a text subtitle information segment and includes text property information for text subtitle data. For example, the text property information may include text alignment information.

In a still further example embodiment, the recording medium stores at least one text subtitle information segment where the text subtitle information segment includes an identifier identifying the text subtitle information segment as a text subtitle information segment, includes text property information for text subtitle data, and includes style information for text subtitle data.

The present invention further provides apparatuses and methods for recording and reproducing the data structure according to the present invention.

BRIEF DESCRIPTION OF THE DRAWINGS

The accompanying drawings, which are included to provide a further understanding of the invention, illustrate the exemplary embodiments of the invention, and together with the description, serve to explain the principles of the present invention.

In the drawings:

FIG. 3 illustrates an example embodiment of the data structure for a page composition segment recorded on a high-density recording medium in accordance with the present invention;

FIG. 4 illustrates an example embodiment of the data structure for a color definition segment recorded on a high-density recording medium in accordance with the present invention;

FIGS. 5-8 illustrate example embodiments of the data structure for an object data segment recorded on a high-density recording medium in accordance with the present invention;

FIG. 9 illustrates an example embodiment of the data structure for an end of display set segment recorded on a high-density recording medium in accordance with the present invention;

FIG. 13 illustrates another exemplary embodiment of the page composition segment syntax in accordance with the present invention; and FIGS. 14-15 illustrate other exemplary embodiments of the object data segment syntax in accordance with the present invention.

DETAILED DESCRIPTION OF EXEMPLARY EMBODIMENTS

In order that the invention may be fully understood, exemplary embodiments thereof will now be described with reference to the accompanying drawings.

Figure 1:
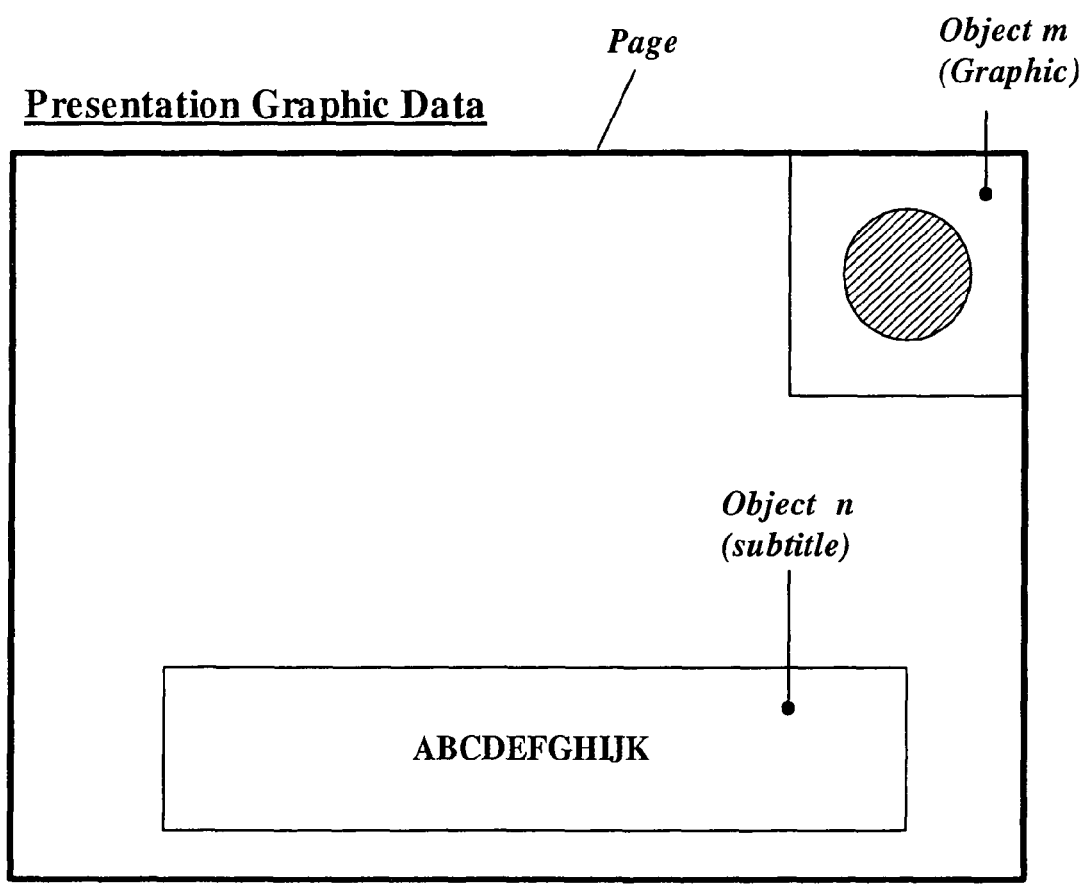
FIG. 1 illustrates an example of a plurality of objects displayed in a page in accordance with the present invention.

According to the present invention, a plurality of objects of presentation graphic data may be included in one page. For example, up to two objects may be displayed in one page as shown in FIG. 1. An object of presentation graphic data recorded on a BD-ROM disk may be recorded as text subtitle data, BMP (bit map) subtitle data, graphic image data, etc. Each object defines a region of presentation graphic data.

Figure 2:
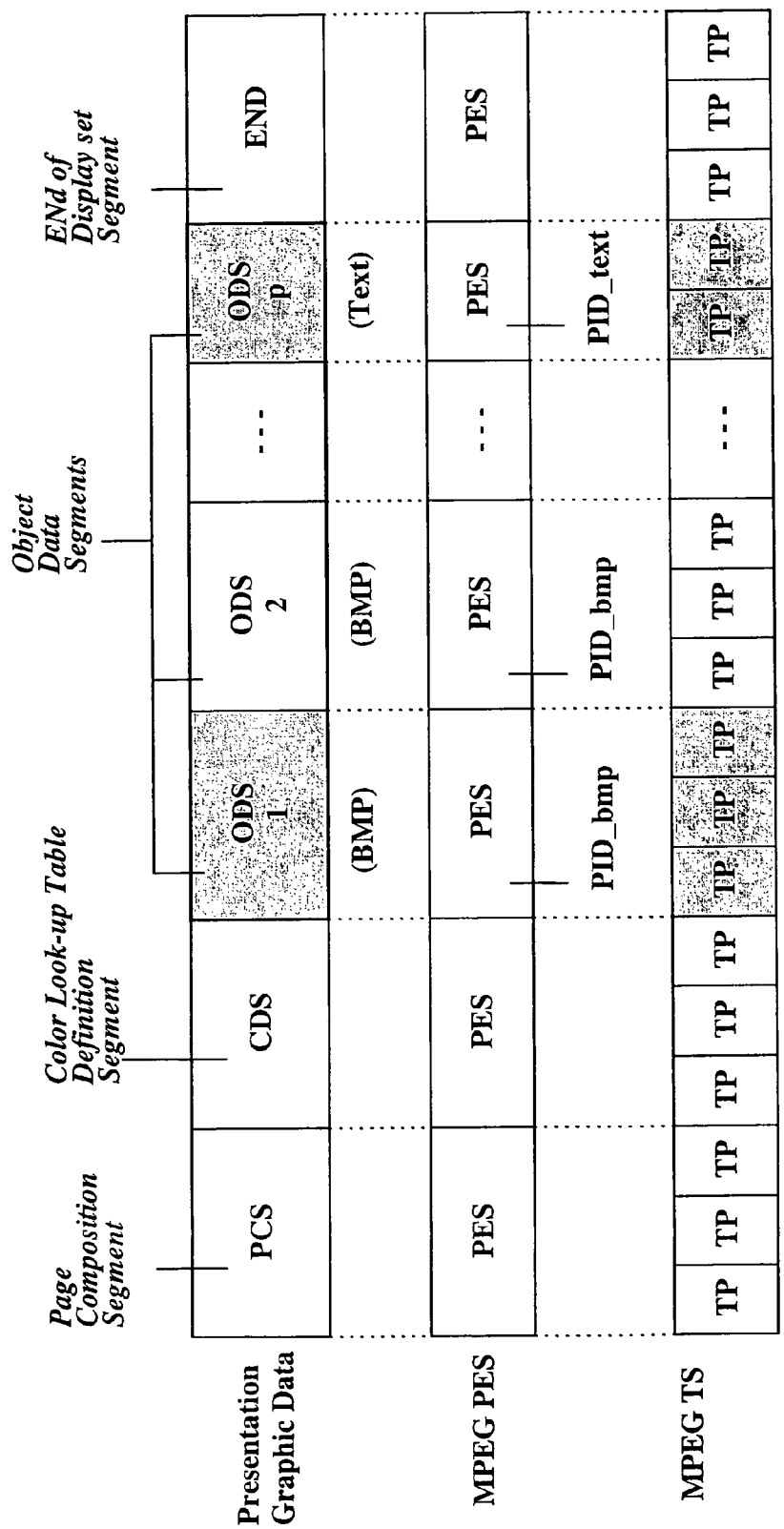
FIG. 2 illustrates presentation graphic data recorded on a high-density optical disk in accordance with the present invention.

Text subtitle data, BMP subtitle data, or graphic image data corresponding to each of the objects is recorded as an object data segment (ODS). At least one object data segment (ODS) may be managed along with one page composition segment (PCS), one color lookup table definition segment (CDS), and one end of display set segment (END) in a hierarchical way as shown in FIG. 2. Each of the above-mentioned segments will be described in detail below.

Each segment in the hierarchical structure is first organized into an MPEG packetized elementary stream (PES) packet and again organized into MPEG transport packets (TPs) before being recorded on a BD-ROM. Namely, each segment (e.g., PCS, CDS, ODS, etc.) is represented by one PES packet. A unique packet ID corresponding to the data type of the object data segment (ODS) is written into the corresponding PES packet. For example, if the object data segment is BMP subtitle data, a unique packet ID, PID_bmp, is written into the corresponding PES packet. Likewise, if the object data segment is text subtitle data, a unique packet ID, PID_text, is written into the corresponding PES packet. The optical disk apparatus for reproducing the BD-ROM, therefore, identifies the data type of each PES packet by examining the packet ID written in the PES packet. The presentation graphic data and main audio/video streams are multiplexed into a single transport stream and stored as a single file.

FIG. 3 illustrates an example embodiment of the data structure for a page composition segment recorded on a high-density recording medium in accordance with the present invention. As shown, the page composition segment (PCS) includes information regarding a segment type, a segment length, a page time-out, a page version number and a page state. The segment type is information for indicating that the segment is a page composition segment (PCS). The segment length indicates the length of the segment. The page time-out is information indicative of when to remove buffering data of the corresponding page from a buffer in a reproducing apparatus. The page version number indicates the version of this PCS. The page state indicates the state of the PCS (e.g., only updating the CDSs linked to the ODSs).

The page composition segment (PCS) also includes a color lookup table ID (CLUT_id), and an indicator of the number of object entries. The CLUT ID indicates the identifier of a CLUT and CDSs having the same CLUT ID are linked to the PCS. For each object entry (i.e., each region of presentation graphic data), the PCS also includes an object ID, an object cropping flag (is_object_cropping), and object horizontal/vertical addresses. The object ID indicates the identifier of an object and links each ODS having that object ID (discussed in detail below) to the PCS. In this manner, ODSs and CDSs may be linked together by the CLUT ID and object ID given in the PCS. The object horizontal/vertical addresses indicate the position of the object on the presentation page (e.g., such as shown in FIG. 1).

If the object cropping flag (is_object_cropping) is set to '1', the object cropping flag information may include object horizontal/vertical cropping data and object cropping width/height data. The object horizontal/vertical cropping data and the object cropping width/length data are recorded for partially displaying an object image. Specifically, the object horizontal/vertical cropping information specify the position of a cropping rectangle (the cropping area) having the dimensions provided by the object cropping width/length. Only that much of the object lying within the cropping rectangle will be displayed.

FIG. 4 illustrates an example embodiment of the data structure for a color lookup table definition segment recorded on a high-density recording medium in accordance with the present invention. As shown in FIG. 4, the color lookup table definition segment (CDS) includes a segment type, a segment length, and a color lookup table ID (CLUT_id). The segment type identifies the segment as a CDS, and the segment length indicates the length of the CDS. The CLUT ID information indicates a family of CLUTs to which the CDS belongs. As will be described in detail below, the CDS provides a single color definition. The family of CLUTs provides a color palette from which to select color definitions.

The color lookup table definition segment may further include information regarding color lookup table entry ID, a brightness value (Y-value), a red chrominance value (Cr-value), a blue chrominance value (Cb-value), and a transparency value (T-value). Accordingly, when linked to an object by a PCS, these values control color attributes of the displayed object such as luminance or brightness, chrominance (Cr and Cb) and transparency. The CLUT entry ID identifies the entry of this CDS in the family of CLUTs (identified by the CLUT ID) to which this CDS belongs.

FIG. 5 illustrates an example embodiment of the data structure for an object data segment recorded on a high-density recording medium in accordance with the present invention. As shown, the object data segment (ODS) includes a segment type, a segment length, and an object type. The segment type indicates the type of the segment as an ODS. The segment length provides the length of the ODS. The object type identifies whether the object data segment is a text subtitle segment, BMP subtitle segment, BMP graphic segment, etc. Namely, the object type identifies the type of data represented by the object data segment.

If the object type indicates that the object data segment is a text subtitle segment, the text object data includes an object ID and a text object number. The object ID identifies the object with which the text subtitle segment is associated. The text object number indicates the number of text objects in this text subtitle segment. For each text object, the text object data includes text property fields, font property fields, and a text length indicator. The text and font property fields will be described below with respect to FIGS. 6 and 7. The text length indicator indicates the length of the text forming this text object of the text subtitle, and a character code is supplied to indicate each character forming the text object.

As shown in FIG. 6, the text property fields include text style information such as text-alignment (e.g., left, right, center, justify, etc.), text-decoration (e.g., overline, underline, line-through, blink, none, etc.), text-indent (e.g., size of the indent), text-transform (e.g., capitalize, uppercase, lowercase, none, etc.), letter-spacing, white-space, word-spacing, and text-justify.

As shown in FIG. 7, the font property fields include font style information such as font, font-family, font-size, font-variant, and font-weight.

If the object type in the ODS were to indicate that the object data segment is BMP subtitle data, the BMP object data includes an object ID, an object width, an object height, run-length code, etc. as shown in FIG. 8. The object ID identifies the object with which the BMP subtitle segment is associated. The object width indicates the width of the object, and the object height indicates the height of the object. The run-length code provides the bit map data in run-length coded format.

FIG. 9 illustrates an example embodiment of the data structure for an end of display set segment recorded on a high-density recording medium in accordance with the present invention. As shown, the end of display set segment (END) includes a segment type, a reserved portion and a segment length. The segment type indicates the segment is an end of display set segment. The reserved portion is reserved for future use, and the segment length indicates the length of the segment.

Figure 10:
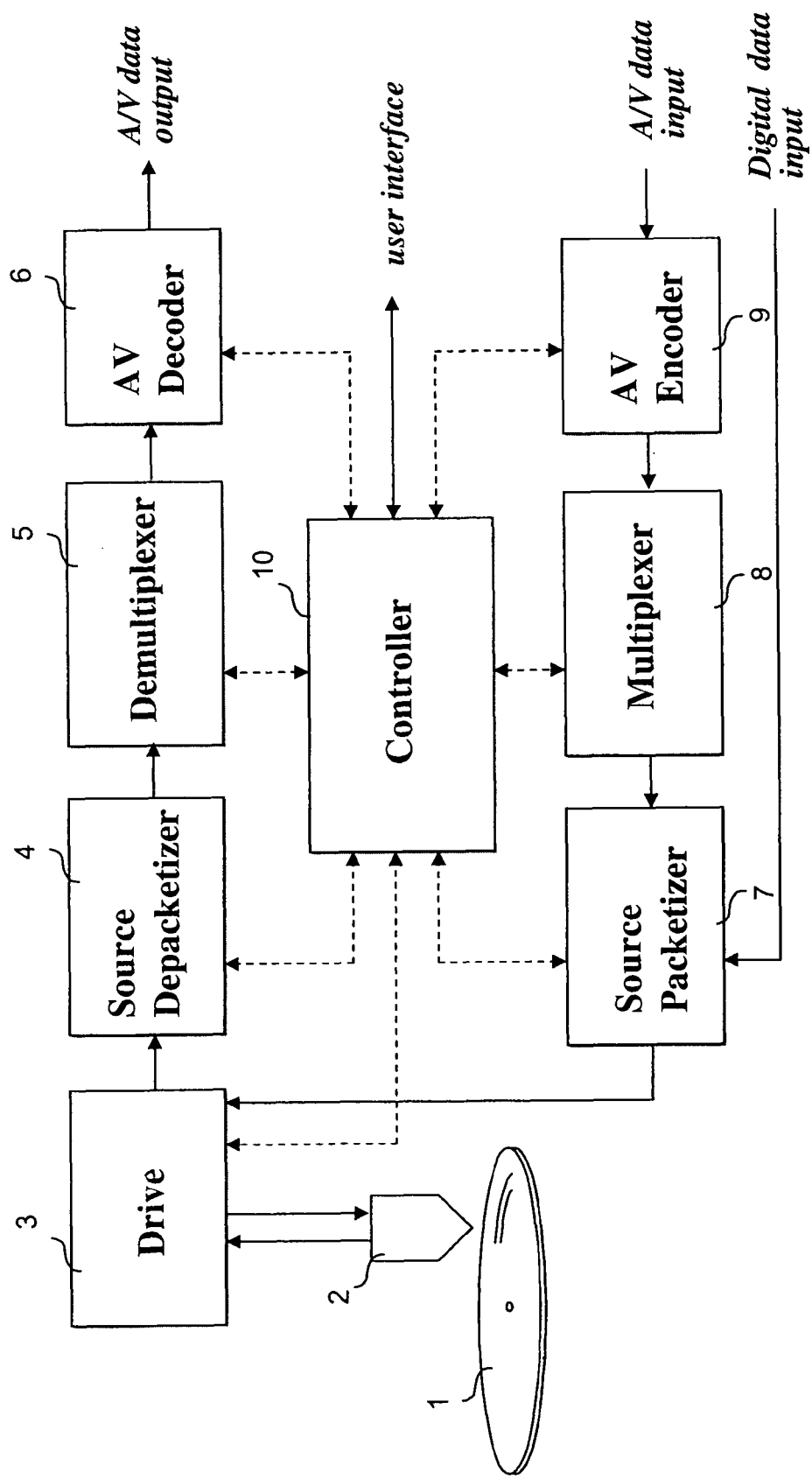
FIG. 10 illustrates a schematic diagram of an embodiment of an optical disk reproducing apparatus of the present invention.

FIG. 10 illustrates a schematic diagram of an embodiment of an optical disk recording and reproducing apparatus according to the present invention. As shown, an AV encoder 9 receives and encodes data (e.g., text subtitle data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 10, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

For example, based on information received via the user interface (e.g., instruction set saved on disk, provided over an intranet or internet by a computer system, etc.) the controller 10 controls the drive 3 to record one or more of the data structures of FIGS. 2-9 and 13-15 (described below) on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 10 has been described as a recording and reproducing apparatus, it will be understood that only a recording or only a reproducing apparatus may be provided using those portions of FIG. 10 providing the recording or reproducing function.

If a user of the optical disk apparatus requests reproduction of text subtitle data among presentation graphic data recorded on the BD-ROM 1, the controller 10 identifies the text subtitle data by checking the packet ID of the PES packet corresponding to the object data segment (ODS) of the text subtitle data as described with reference to FIG. 2 or by checking the object type contained in the object data segment (ODS) of the text subtitle data as described with reference to FIG. 5.

Figure 11:
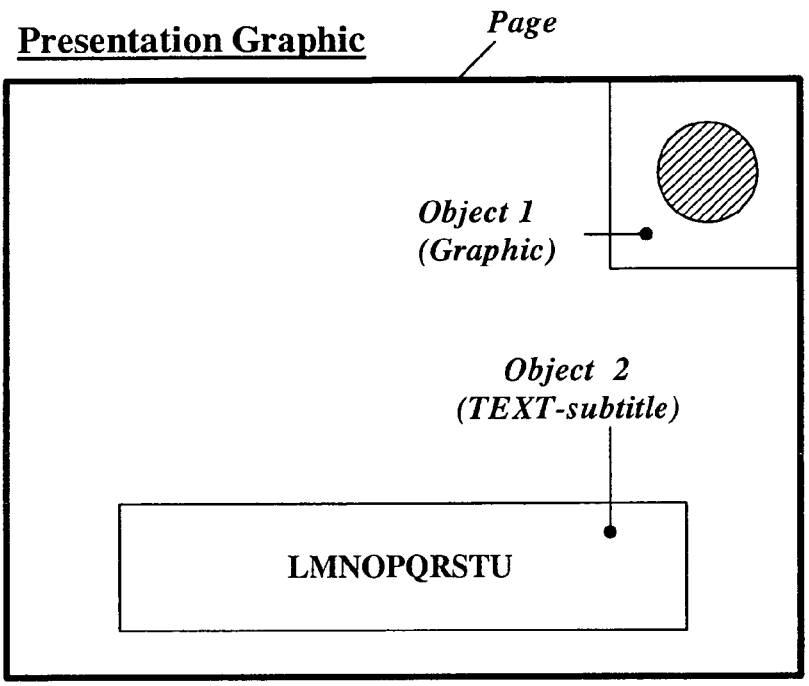
FIGS. 11 and 12 illustrate objects of text subtitle data displayed in various styles in accordance with the present invention.
Figure 12:
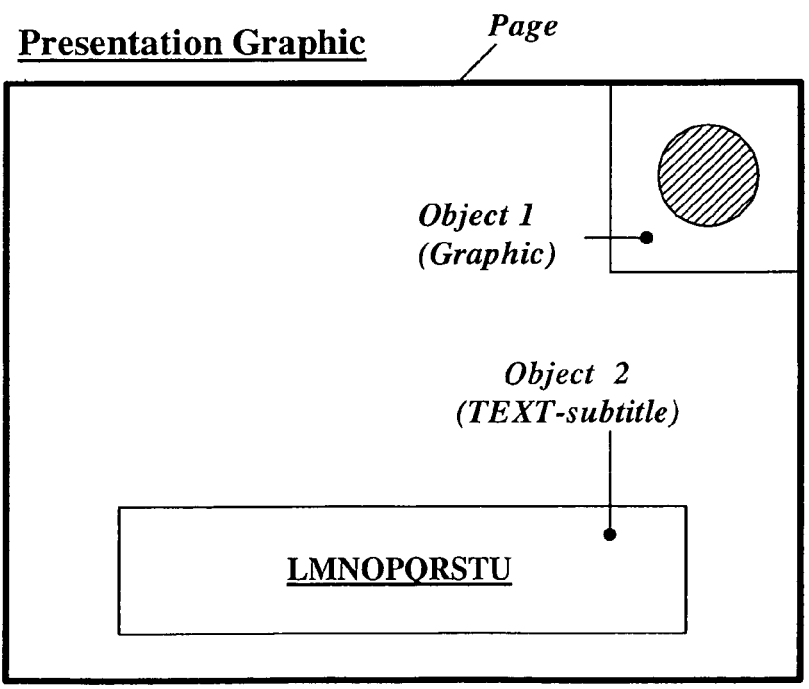

The controller 10 then presents the text subtitle data in various styles according to the text style information included in the text property fields and font style information included in the font property fields, both contained in the object data segment (ODS) of the text subtitle data. As shown in FIG. 11, two objects (Object 1 of a graphic image and Object 2 of text subtitle data) may be simultaneously presented in one page. The object of the text subtitle data (Object 2) may be presented in various text and font styles as shown in FIGS. 11 and 12.

In another embodiment of the present invention, the object type, text property fields, and font property fields, which were included in the object data segment (ODS), are included in the page composition segment (PCS) as shown in FIG. 13. In this case, the controller 10 of the optical disk apparatus presents the object of the text subtitle data in various styles according to the object type information, text property fields, and font property fields included in the page composition segment.

In still another embodiment of the present invention, the text style and font style information is stored in the object data segment (ODS) of the text subtitle data, but the text property fields and font property fields are not classified explicitly. Instead, the text style and font style information is recorded sequentially after a predetermined identification code (e.g., Escape code=0xffff). In this case, the controller 10 of the optical disk apparatus presents the object of the text subtitle data in various text and font styles according to the text style and font style information that follows the predetermined identification code.

In yet another embodiment of the present invention, the text object data segment (Text-ODS) is recorded in parallel with the page composition segment (PCS), color lookup table definition segment (CDS), and a different type of object data segment (ODS) (e.g., BMP object data segment or graphic image object data segment). In this embodiment, the segment type information included in the text object data segment (Text-ODS) has a unique value indicating that the segment is a text object data segment. The other fields in the text-ODS are as described with respect to FIG. 5.

The other type of object data segment (ODS) (e.g., BMP object data segment (BMP-ODS)) is shown in FIG. 15. This ODS includes segment type information having a unique value for indicating that the segment is, for example, a BMP object data segment (BMP-ODS). The other fields in the ODS are as described with respect to FIG. 8.

The controller 10 of the optical disk apparatus is capable of selectively reproducing text object data segments by referring to the segment type information and displaying the text objects in various text and font styles according to the text property fields and font property fields included therein.

The present invention provides a recording medium having a data structure for managing the reproduction of subtitle data, and provides methods and apparatuses for recording the data structure on the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory computer readable medium having an executable data structure for managing reproduction of text subtitle data by a reproducing apparatus, comprising:

an area storing at least one main AV data and a plurality of subtitle information segments, each one of the subtitle information segments being represented by each PES packet of transport packets and having a one-to-one correspondence with each PES packet, the PES packet including a packet identifier for identifying a type of the packet, wherein each one of the subtitle information segments includes a segment identifier identifying the subtitle information segment as one of text data and graphic data, wherein a first subtitle information segment identified as the text data includes at least one first style information and palette information, the palette information including a palette identifier identifying the corresponding palette information for controlling color attributes of the text data, wherein a second subtitle information segment identified as the text data includes at least two text subtitle regions, each of the text subtitle regions including second style information applied to the text data for managing reproduction of the text data by the reproducing device, each of the text subtitle regions being linked to the first style information defined in the first subtitle information segment by an identifier, each of the text subtitle regions including length information for indicating a length of a number of characters of a text string on the corresponding text subtitle region to be displayed, wherein the graphic data is multiplexed with the main AV data into a file while the text data is separate from the main AV data, wherein either one of the graphic data or the text data is displayed together with the main AV data.

2. The computer readable medium of claim 1, wherein the second style information indicates at least one of font size, font style and font set for the text data.

3. The computer readable medium of claim 1, wherein the text data is character code data.

4. The computer readable medium of claim 1, wherein the second subtitle information segment identified as the text data includes an indicator of a number of the at least one text subtitle region.

5. A method of recording text subtitle data on a recording medium using a recording apparatus, the method comprising:

recording at least one main AV data and a plurality of subtitle information segments on the recording medium using the recording apparatus, each one of the subtitle information segments being represented by each PES packet of transport packets and having a one-to-one correspondence with each PES packet, the PES packet including a packet identifier for identifying a type of the packet, wherein each one of the subtitle information segments includes a segment identifier identifying the subtitle information segment as one of text data and graphic data, wherein a first subtitle information segment identified as the text data includes at least one first style information and palette information, the palette information including a palette identifier identifying the corresponding palette information for controlling color attributes of the text data, wherein a second subtitle information segment identified as the text data includes at least two text subtitle regions, each of the text subtitle regions including second style information applied to the text data for managing reproduction of the text data by the reproducing device, each of the text subtitle regions being linked to the first style information defined in the first subtitle information segment by an identifier, each of the text subtitle regions including length information for indicating a length of a number of characters of a text string on the corresponding text subtitle region to be displayed, wherein the graphic data is multiplexed with the main AV data into a file while the text data is separate from the main AV data, wherein either one of the graphic data or the text data is displayed together with the main AV data.

6. The method of claim 5, wherein the second style information indicates at least one of font size, font style and font set for the text data.

7. The method of claim 5, wherein the text data is character code data.

8. The method of claim 5, wherein the second subtitle information segment identified as the text data includes an indicator of a number of the at least one text subtitle region.

9. A method of reproducing text subtitle data from a recording medium using a reproducing apparatus, comprising:

reproducing at least one main AV data and a plurality of subtitle information segments from the recording medium using the reproducing apparatus, each one of the subtitle information segments being represented by each PES packet of transport packets and having a one-to-one correspondence with each PES packet, the PES packet including a packet identifier for identifying a type of the packet, wherein each one of the subtitle information segments includes a segment identifier identifying the subtitle information segment as one of text data and graphic data, wherein a first subtitle information segment identified as the text data includes at least one first style information and palette information, the palette information including a palette identifier identifying the corresponding palette information for controlling color attributes of the text data, wherein a second subtitle information segment identified as the text data includes at least two text subtitle regions, each of the text subtitle regions including second style information applied to the text data for managing reproduction of the text data by the reproducing device, each of the text subtitle regions being linked to the first style information defined in the first subtitle information segment by an identifier, each of the text subtitle regions including length information for indicating a length of a number of characters of a text string on the corresponding text subtitle region to be displayed, wherein the graphic data is multiplexed with the main AV data into a file while the text data is separate from the main AV data, wherein either one of the graphic data or the text data is displayed together with the main AV data.

10. The method of claim 9, wherein the second style information indicates at least one of font size, font style and font set for the text data.

11. The method of claim 9, wherein the text data is character code data.

12. The method of claim 9, wherein the second subtitle information segment identified as the text data includes an indicator of a number of the at least one text subtitle region.

13. An apparatus for recording text subtitle data on a recording medium, comprising:
   a pickup configured to record data on the recording medium; and
   a controller configured to control the pickup to record at least one main AV data and a plurality of subtitle information segments on the recording medium,
   each one of the subtitle information segments being represented by each PES packet of transport packets and having a one-to-one correspondence with each PES packet, the PES packet including a packet identifier for identifying a type of the packet, wherein each one of the subtitle information segments includes a segment identifier identifying the subtitle information segment as one of text data and graphic data,
   wherein a first subtitle information segment identified as the text data includes at least one first style information and palette information, the palette information including a palette identifier identifying the corresponding palette information for controlling color attributes of the text data,
   wherein a second subtitle information segment identified as the text data includes at least two text subtitle regions, each of the text subtitle regions including second style information applied to the text data for managing reproduction of the text data by the reproducing device, each of the text subtitle regions being linked to the first style information defined in the first subtitle information segment by an identifier, each of the text subtitle regions including length information for indicating a length of a number of characters of a text string on the corresponding text subtitle region to be displayed,
   wherein the graphic data is multiplexed with the main AV data into a file while the text data is separate from the main AV data,
   wherein either one of the graphic data or the text data is displayed together with the main AV data.

14. The apparatus of claim 13, wherein the second style information indicates at least one of font size, font style and font set for the text data.

15. The apparatus of claim 13, wherein the text data is character code data.

16. The apparatus of claim 13, wherein the second subtitle information segment identified as the text data includes an indicator of a number of the at least one text subtitle region.

17. An apparatus for reproducing text subtitle data from a recording medium, comprising:
   a pickup configured to reproduce data recorded on the recording medium; and
   a controller configured to control the pickup to reproduce at least one main AV data and a plurality of subtitle information segments from the recording medium,
   each one of the subtitle information segments being represented by each PES packet of transport packets and having a one-to-one correspondence with each PES packet, the PES packet including a packet identifier for identifying a type of the packet, wherein each one of the subtitle information segments includes a segment identifier identifying the subtitle information segment as one of text data and graphic data,
   wherein a first subtitle information segment identified as the text data includes at least one first style information and palette information, the palette information including a palette identifier identifying the corresponding palette information for controlling color attributes of the text data,
   wherein a second subtitle information segment identified as the text data includes at least two text subtitle regions, each of the text subtitle regions including second style information applied to the text data for managing reproduction of the text data by the reproducing device, each of the text subtitle regions being linked to the first style information defined in the first subtitle information segment by an identifier, each of the text subtitle regions including length information for indicating a length of a number of characters of a text string on the corresponding text subtitle region to be displayed,
   wherein the graphic data is multiplexed with the main AV data into a file while the text data is separate from the main AV data,
   wherein either one of the graphic data or the text data is displayed together with the main AV data.

18. The apparatus of claim 17, wherein the second style information indicates at least one of font size, font style and font set for the text data.

19. The apparatus of claim 17, wherein the text data is character code data.

20. The apparatus of claim 17, wherein the second subtitle information segment identified as the text data includes an indicator of a number of the at least one text subtitle region.

* * * * *